United States Patent [19]
Edsall

[11] 3,749,451
[45] July 31, 1973

[54] VEHICLE BRAKE SYSTEM
[75] Inventor: Bruce M. Edsall, Southfield, Mich.
[73] Assignee: General Motors Corporation, Detroit, Mich.
[22] Filed: Feb. 23, 1972
[21] Appl. No.: 228,751

[52] U.S. Cl............ 303/6 C, 188/345, 303/21 AF, 303/21 F
[51] Int. Cl................................................ B60t 8/10
[58] Field of Search.............. 303/6 C, 21 AF, 21 F, 303/21 A; 188/345

[56] References Cited
UNITED STATES PATENTS
2,152,074  3/1939  McInnerney.................... 188/345
3,512,844  5/1970  Stelzer............................. 303/21 F FOREIGN PATENTS OR APPLICATIONS
599,937  6/1960  Canada........................... 188/345

Primary Examiner—Richard A. Schacher
Attorney—W. E. Finken, D. D. McGraw et al.

[57] ABSTRACT

A vehicle brake system having three hydraulic circuits, one going to the two rear wheels and the other two respectively going to each of the two front wheels. A wheel lock control system is used on the rear wheels. The three circuits are actuated by a master cylinder assembly having three separate pressurizing chambers. When the vehicle is equipped with front disc brakes and rear drum brakes, metering or hold-off valves are used in each of the front brake circuits to hold off the front disc brake pressure until the rear drum brakes are sufficiently pressurized to engage brake shoes with the brake drums. A rear brake proportioning valve may also be used in the rear brake circuit. If all wheels have disc brakes, the front brake circuit metering valves are not required.

10 Claims, 3 Drawing Figures

PATENTED JUL 31 1973 3,749,451

VEHICLE BRAKE SYSTEM

The invention relates to three-circuit vehicle brake systems which achieve high deceleration rates even when one of the three brake circuits has a pressure loss occurrence. There have been numerous proposals of systems for achieving vehicle partial braking and controllability in the event that a pressure loss occurs in a portion of the brake hydraulic actuating system. Such proposals have included a mechanical brake apply arrangement which is actuated whenever the service brake pedal is depressed beyond the normal amount of travel. In recent years the most common arrangement is the provision of a dual master cylinder in which the front vehicle brakes are actuated through one circuit connected to one master cylinder pressurizing chamber and the rear vehicle brakes are actuated through a second circuit connected to the other master cylinder pressurizing chamber. Other proposals for splitting the brake system into various circuits have included connecting together the opposite front and rear brakes, and the use of dual wheel cylinder pistons in either the front brakes or the rear brakes or both and connecting different circuits to the pistons. Such systems require considerable additional hoses and pipes, redundant metering valves and proportioners, and higher than normal pedal effects to obtain high deceleration rates.

The invention herein disclosed and claimed eliminates many of the disadvantages of such systems. Brake systems embodying the invention use rear wheel lock controls to obtain the known advantages of such controls, without using costly redundant parts which serve no useful purpose when all wheel brakes are functioning normally.

In the preferred embodiment, the system uses a master cylinder having three pressurizing chambers, the two rear wheel brakes being connected in one circuit to one pressurizing chamber and each of the two front wheel brakes being connected in separate circuits respectively connected to the other two master cylinder pressurizing chambers. This three-circuit split arrangement gives excellent controllability during normal braking and also during braking with one of the circuits having suffered pressure loss. Controllability and braking with a pressure loss in one of the front brake circuits are improved when the rear wheels are prevented from locking. The invention provides high deceleration rates when one of the brake circuits has suffered a pressure loss. It eliminates the need for extra heavy rear brake drums to provide adequate fade resistance when one of the front brakes has a pressure loss. Since the system provides an immediate warning when a pressure loss in one circuit occurs, a braking stop after a circuit pressure loss is made with either both front brakes or with one front brake and both rear brakes. It requires no redundancy of proportioning valves and wheel lock control modulators in the wheel brake system, eliminates the need for dual hoses and piping, and the necessity for providing separate wheel lock control modulators for each front wheel brake circuit. The system can be installed in vehicles so as to utilize current production-type hydraulic brake system piping and current rear wheel lock control units. Depending upon the particular brake arrangement, current types of metering and proportioning valves are also used.

IN THE DRAWING

Figure 1:
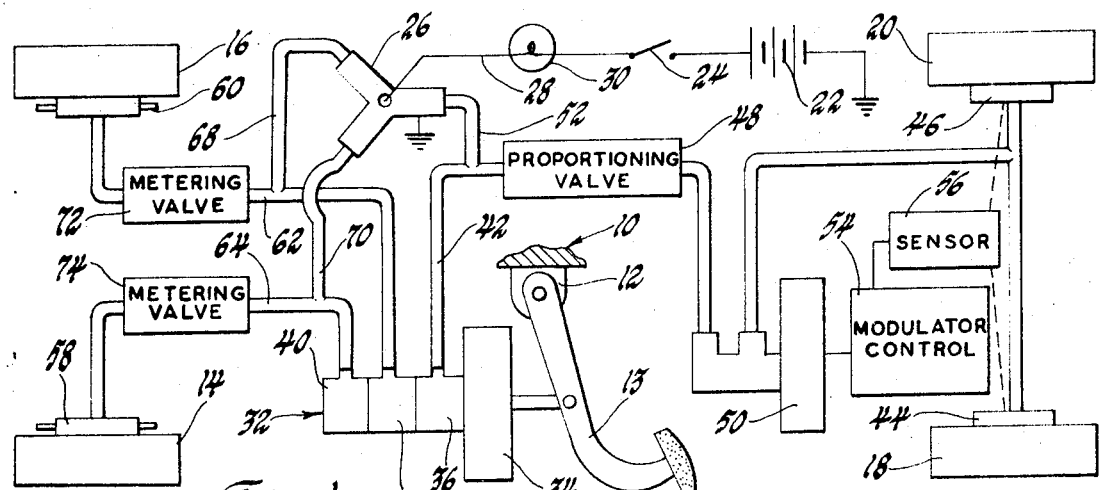
FIG. 1 is a schematic illustration of a vehicle wheel brake system embodying the invention in a vehicle having front disc and rear drum brakes.

The vehicle 10 in which the system of FIG. 1 is installed is schematically illustrated as having a fixed portion 12 to which the brake pedal arm 13 is pivotally attached. The vehicle is also provided with left and right front wheels 14 and 16 and left and right rear wheels 18 and 20. The system is equally usable in vehicles having a front wheel drive, a rear wheel drive, or a four-wheel drive. The vehicle also has a source of electrical energy schematically illustrated as battery 22, and an ignition switch 24. A pressure loss signal sensing device 26 comprising warning switch means is hydraulically connected to the various brake circuits in a manner to be described and is electrically connected in a warning circuit 28 which contains battery 22 and switch 24 in series with a suitable warning device such as lamp 30. If any of the hydraulic circuits to which sensing device 28 is connected suffers a pressure loss during braking which causes a pressure decrease in at least one of the circuits to a predetermined pressure differential in relation to the pressure in at least one of the other circuits, with the ignition switch 24 being closed, warning device 30 is energized to indicate this fact and so warn the vehicle operator.

The vehicle brake pedal arm 13 is suitably connected to operate the master cylinder assembly 32 under control of the vehicle operator. A brake booster 34 is also illustrated intermediate brake pedal arm 13 in the master cylinder assembly 32. The master cylinder assembly has three chambers 36, 38 and 40, each being pressurized by suitable pressurizing pistons or their equivalents, such as a direct hydraulic pressure apply arrangement, when the master cylinder is actuated. A rear brake supply pressure line or conduit 42 received pressure from chamber 36 and delivers that pressure to the rear wheel drum brakes 44 and 46 as rear brake apply pressure. These drum brakes are respectively associated with rear wheels 18 and 20. A proportioning valve 48 is fluid connected in line 42, followed in series by a wheel lock control modulator 50. Line 42 also has a branch line 52 fluid connected to the pressure loss sensing device 26, the connection with line 42 being intermediate pressurizing chamber 36 and proportioning valve 48. The brake modulator 50 is provided with a suitable modulator control 54 and a sensor 56 for sensing the rotating conditions of the rear wheels, generating appropriate wheel lock control signals and controlling the modulator accordingly. Since such systems are well known in the art and are in production use on currently manufactured vehicles, no further description or explanation of the wheel lock control need be provided.

The front wheels 14 and 16 are respectively provided with disc brakes 58 and 60. Master cylinder pressurizing chamber 38 is fluid connected by brake line or conduit 62 to disc brake 60, and master cylinder pressurizing chamber 40 is fluid connected by brake line or conduit 64 to disc brake 58 for hydraulic pressure actuation of these brakes when the master cylinder is energized. Line 62 and 64 respectively have branch lines 68 and 70 which are fluid connected to pressure loss signal sensing device 26. Brake lines 62 and 64 also respectively have metering valves 72 and 74 in series therein intermediate the master cylinder and their respective disc brakes, with their respective branch lines 68 and 70 being connected to them intermediate the master cylinder and the respective metering valves. It is to be understood that the metering valves are of the type which initially hold off any substantial braking pressure from the front disc brakes 58 and 60 when the master cylinder is actuated until there is a sufficient brake apply pressure delivered through line 42 to the rear drum brakes 44 and 46 to normally permit the brake shoes in the rear brakes to engage the drums. Thereafter, the metering valves permit a pressure increase in the front disc brakes to actuate them. Such metering valves are in common use at this time in vehicles having front discs and rear drum brakes and are well known in the art. The proportioning valve 48 in the rear brake line 42 operates to proportion the rear brake apply pressure so that it increases at a lower rate having once passed an initial pressure point. Thus, at the higher braking pressures, the front wheel brakes are subjected to higher apply pressures than the rear brakes. This prevents or limits overbraking of the rear brakes in relation to the front brakes under circumstances in which the front wheels are normally subjected to high dynamic loading during deceleration as compared to the rear wheels.

During normal brake operations with all circuits functioning properly, the vehicle operator actuates the brake pedal arm 13 by depressing it, causing the master cylinder 32 to pressurize brake fluid in each of its pressurizing chambers. The pressure from chamber 36 is delivered by line 42 through proportioning valve 48 and the modulator 50 to the rear brakes 44 and 46. The pressure generated in chamber 38 is delivered by line 62 through metering valve 72 to the front disc brake 60, the metering valve performing its above-described function as the supply brake pressure increases. The pressure generated in chamber 40 is delivered by line 64 through metering valve 74 to the front disc brake 58, the metering valve performing its above-described function as the supply brake pressure increases.

The pressures in each of the lines 42, 62 and 64 are also imposed on sensing device 26 through the respective branch lines 52, 68 and 70. Since the system is operating normally, the sensing device 26 will not be actuated, and electrical circuit 28 will not be energized.

If a pressure loss should occur in line 62, for example, vehicle braking effort will continue at brakes 44, 46 and 58. The pressure loss will be sensed through line 68 by sensing device 26 and the warning lamp 30 will be energized. A high deceleration rate is still obtained since both rear brakes continue to provide normal braking force and the left front disc brake 58 does the same. Should the rear wheels approach a wheel lock condition, the sensor 56 will sense that fact, and the modulator control 54 will actuate the modulator 50 to control rear wheel brake apply pressure delivered to brakes 44 and 46 to prevent wheel lock and thereby maintain vehicle controllability. If the pressure loss occurred in line 64 instead of line 62, similar results would be obtained with brake 60 braking the right front wheel 16. If the pressure loss had occurred in line 42, the vehicle would continue to have full braking at both front wheels and would still be able to decelerate at a relatively high rate.

Figure 2:
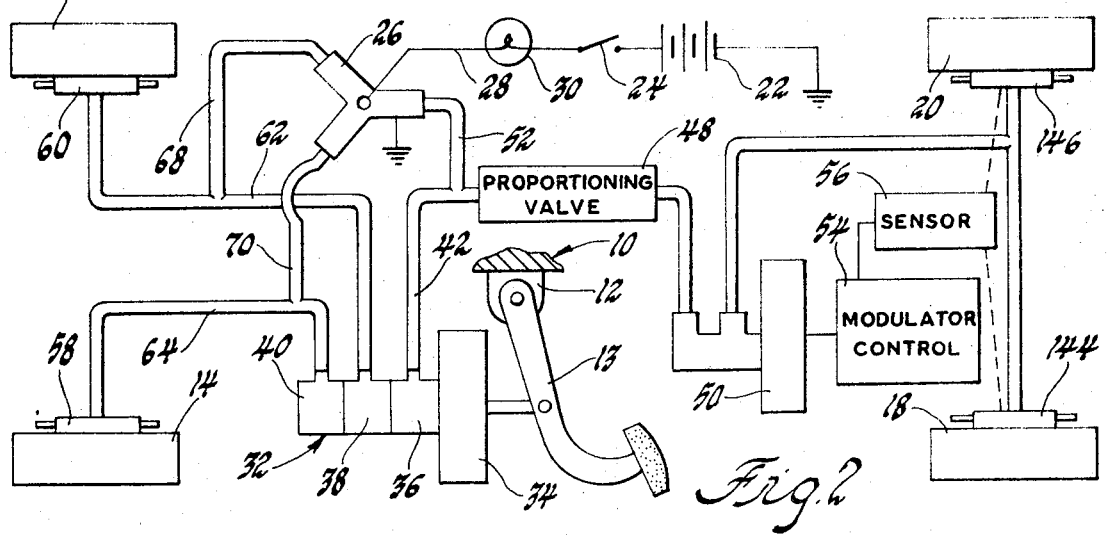
FIG. 2 is a schematic illustration of a vehicle wheel brake system embodying the invention in a vehicle having disc brakes for the front and rear wheels.

The modification shown in FIG. 2 is similar to that of FIG. 1, and the same reference numerals are utilized to identify the same parts. In this system, the rear wheels 18 and 20 are respectively provided with disc brakes 144 and 146 instead of drum brakes. This eliminates the need for the front brake circuit metering valves since no pressure hold-off is now required to permit the rear brakes to engage at the same time that the front brakes engage. Otherwise, the system functions in the same manner as does the system of FIG. 1.

Figure 3:
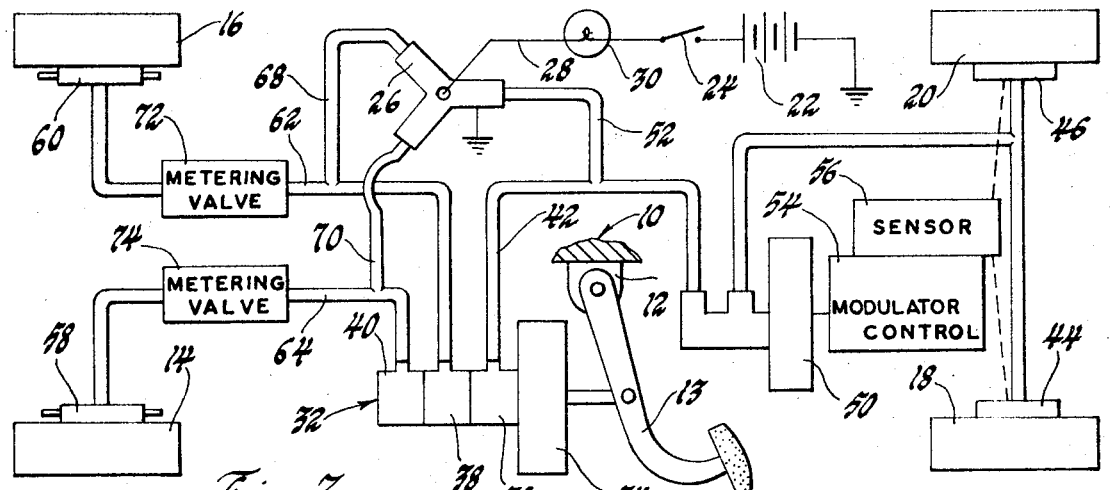
FIG. 3 is a schematic illustration of a vehicle wheel braking system embodying the invention and installed in a vehicle having front disc and rear drum brakes. The system is a modification of the system illustrated in FIG. 1.

The system shown in FIG. 3 is a modification of the system shown in FIG. 1 and the same reference numerals are utilized. In this system, however, the proportioning valve 48 is eliminated, relying only on the wheel lock control unit, composed of modulator 50, modulator control 54 and the rear wheel sensor 56, to control rear brake pressure. The system otherwise operates in the same manner as does the system of FIG. 1.

Systems embodying the invention provide a high degree of high deceleration rate capability while minimizing redundancy of parts and circuits. This is done while maintaining excellent vehicle controllability during all types of braking.

What is claimed is:

1. In a vehicle having a left front wheel and a right front wheel and a pair of rear wheels and brakes for each of said wheels, a vehicle wheel braking system comprising:
    a master cylinder having three pressurizing chambers and means for pressurizing brake fluid therein;
    a first conduit connecting a first one of said chambers to said left front wheel brake and having a first brake pressure metering valve therein fluidly intermediate said master cylinder and said left front wheel brake;
    a second conduit connecting a second one of said chambers to said right front wheel brake and having a second brake pressure metering valve therein fluidly intermediate said master cylinder and said right front wheel brake;
    a third conduit connecting the third one of said chambers to said pair of rear wheel brakes and having a brake pressure proportioning valve and a wheel lock control pressure modulator therein fluidly intermediate said master cylinder and said pair of rear wheel brakes;
    and modulator control means for controlling said modulator to control the rear brake apply pressure to prevent excessive rear wheel slip and rear wheel lock.

2. The vehicle wheel braking system of claim 1 further comprising:
    warning switch means connected with each of said conduits fluidly adjacent said master cylinder and actuable upon pressure decrease in at least one of said conduits to a predetermined pressure differential in relation to the pressure in at least one other of said conduits to energize a warning device.

3. In a vehicle having a left front wheel and a right front wheel and a pair of rear wheels and brakes for each of said wheels,
a vehicle wheel braking system comprising:

a brake master cylinder having three pressurizing chambers and means for selectively pressurizing brake fluid therein;

a first brake fluid conduit fluidly connecting a first one of said chambers to said left front wheel brake;

a second brake fluid conduit fluidly connecting a second one of said chambers to said right front wheel brake;

a third brake fluid conduit fluidly connecting the third one of said chambers to said pair of rear wheel brakes and having a brake pressure proportioning valve and a wheel lock control rear brake pressure modulator therein fluidly intermediate said third one of said chambers and said rear wheel brakes;

and rear brake pressure modulator control means for controlling said modulator to modulate rear wheel brake pressure in accordance with sensed rear wheel slip.

4. The vehicle wheel braking system of claim 3 further comprising:

warning switch means connected with each of said conduits fluidly adjacent said master cylinder and actuable upon pressure decrease in at least one of said conduits to a predetermined pressure differential in relation to the pressure in at least one other of said conduits to energize a warning device.

5. In a vehicle having left and right front and rear wheels and hydraulic fluid pressure actuated brakes for each of said wheels, a vehicle wheel braking system comprising:

a brake master cylinder having three pressurizing chambers and means for pressurizing brake fluid therein;

a first conduit connecting a first one of said chambers to said left front wheel brake and having a first brake pressure metering valve therein fluidly intermediate said master cylinder and said left front wheel brake;

a second conduit connecting a second one of said chambers to said right front wheel brake and having a second brake pressure metering valve therein fluidly intermediate said master cylinder and said right front wheel brake;

a third conduit connecting the third one of said chambers to said left and right rear wheel brakes and having a wheel lock control rear brake pressure modulator therein fluidly intermediate said third one of said chambers and said rear wheel brakes;

and rear brake apply pressure modulator control means and rear wheel slip sensing means for controlling said modulator to modulate rear wheel brake apply pressure in accordance with sensed rear wheel slip.

6. The vehicle wheel braking system of claim 5 further comprising:

warning switch means connected with each of said conduits fluidly adjacent said master cylinder and actuable upon pressure decrease in at least one of said conduits to a predetermined pressure differential in relation to the pressure in at least one other of said conduits to energize a warning device.

7. In a vehicle having left and right wheels arranged as pairs of front and rear wheels and fluid pressure actuated brakes for said wheels, a vehicle wheel braking system comprising:

a source of brake supply pressures supplying pressurized fluid from three separate pressure chambers when actuated;

first and second independent brake fluid supply pressure conduit means respectively fluid pressure connecting first and second ones of said pressure chambers to said left and right front wheel brakes to supply brake apply pressures thereto;

third independent brake fluid conduit means fluid pressure connecting the third one of said pressure chambers to said pair of rear wheel brakes to supply brake apply pressures thereto and having rear wheel brake apply pressure modifying means therein;

and control means for said rear wheel brake apply pressure modifying means actuable in response to sensed rear wheel slip to modify rear wheel brake apply pressures and thereby lessen the occurrence of rear wheel lock.

8. The vehicle wheel braking system of claim 7, the brakes of at least one of said pairs of wheels being disc brakes and the conduit means associated therewith having valve means therein modifying the brake supply pressures therein from said source in a predetermined pressure relation to the brake supply pressures normally simultaneously provided in the other conduit means for the other pair of wheel brakes.

9. The wheel braking system of claim 8, said front wheel brakes being disc brakes and said rear wheel brakes being drum brakes and said valve means including a metering valve in each of said first and second conduit means.

10. The wheel braking system of claim 8, said rear wheel brakes being disc brakes and said valve means including a proportioning valve in said third conduit means positioned fluidly intermediate said third one of said pressure chambers and said rear wheel brake apply pressure modifying means.

* * * * *